Dec. 17, 1963 T. E. FIDDLER 3,114,404
RETAINER FOR SECURING A THREADED MEMBER IN A BODY APERTURE
Filed Sept. 15, 1960 2 Sheets-Sheet 1
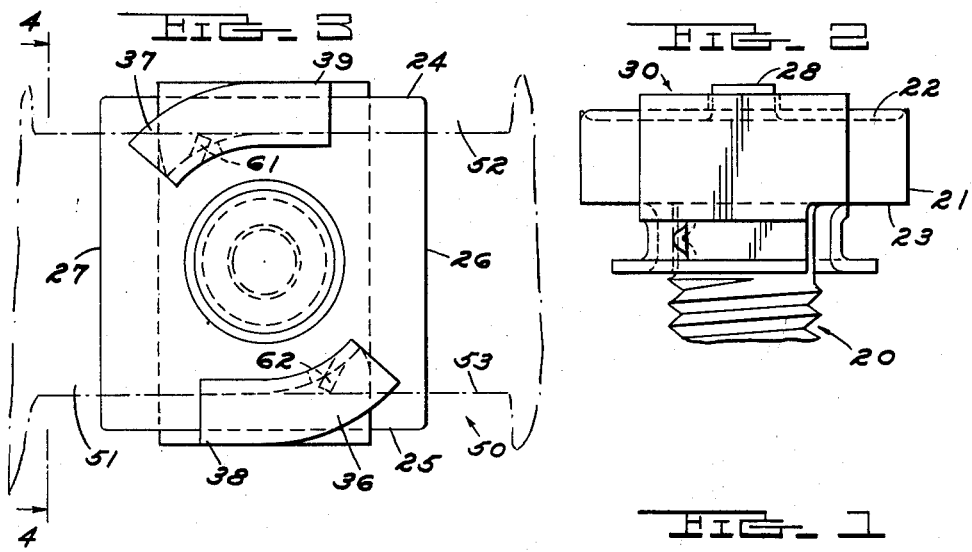
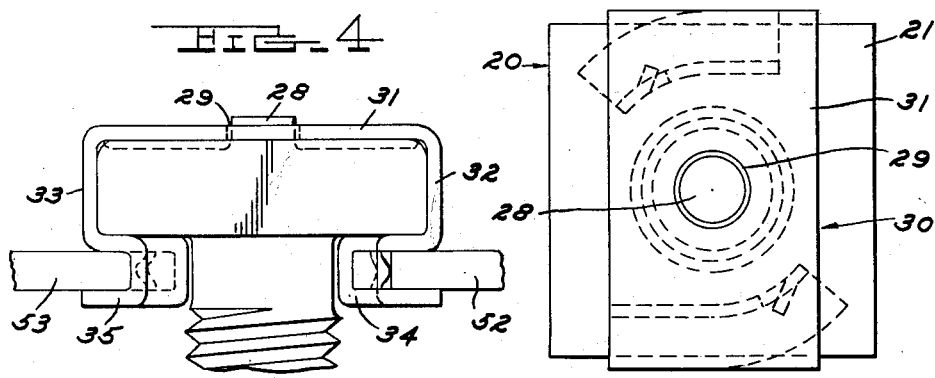
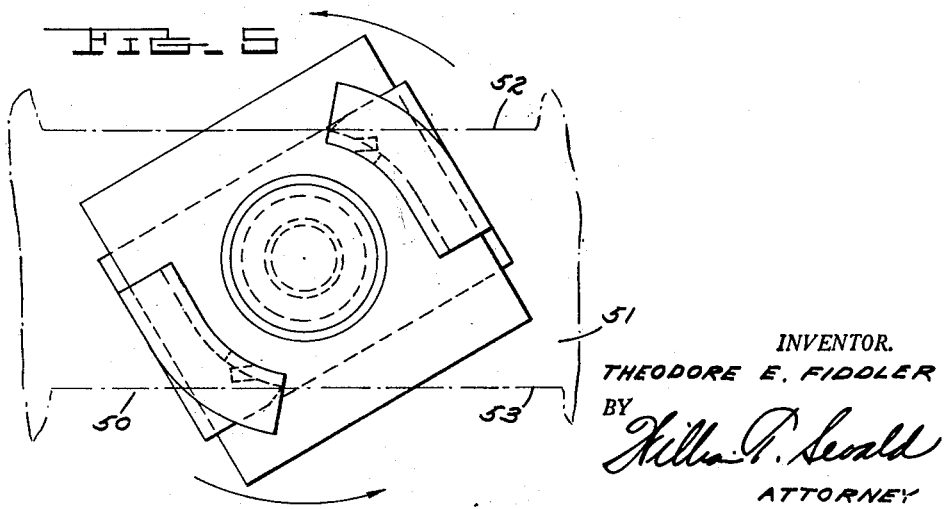
INVENTOR.
THEODORE E. FIDDLER
BY
ATTORNEY

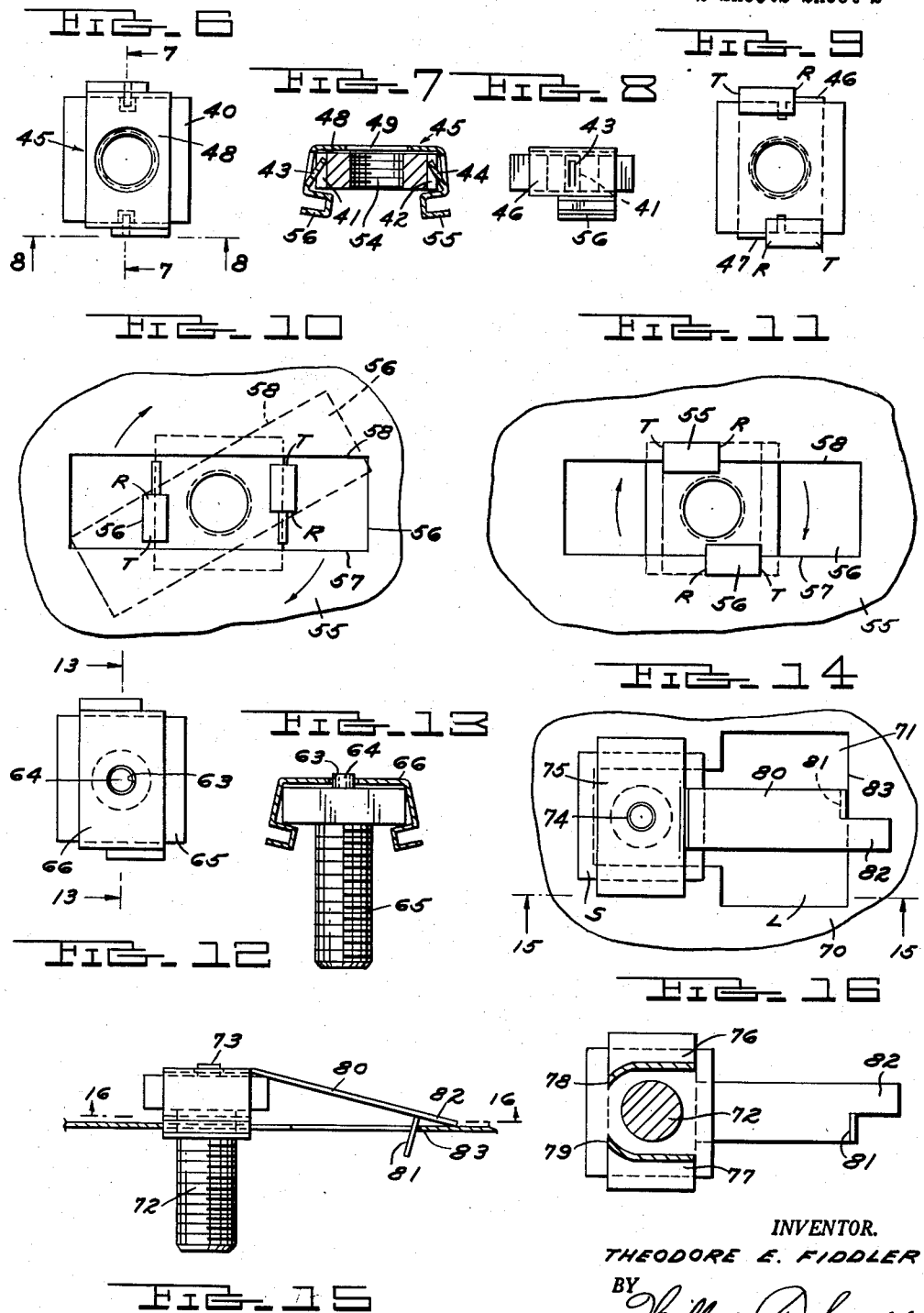

United States Patent Office 3,114,404
Patented Dec. 17, 1963

3,114,404
RETAINER FOR SECURING A THREADED
MEMBER IN A BODY APERTURE
Theodore E. Fiddler, 1200 Cedar Ave.,
Birmingham, Mich.
Filed Sept. 15, 1960, Ser. No. 56,251
1 Claim. (Cl. 151—41.75)

This invention relates to a fastening device for positioning, holding, and anti-rotationally securing threaded members such as nuts and bolts in the aperture of a body.

Fastening devices for holding nuts and bolts have been employed heretofore to facilitate the positioning and holding of the nut or bolt relative to a body, and securing same against relative rotation, however, the several devices of the prior art have not proven entirely satisfactory inasmuch as they are complicated in design and construction, expensive to manufacture, and difficult to use in positioning the threaded member in the fastener and then difficult in mounting the fastener in the body aperture.

With the foregoing in view, the primary object of the invention is to provide a fastening device for positioning and holding threaded members, such as nuts and bolts, which is simple in design and construction, inexpensive to manufacture, easy to position the threaded member therein and easy to mount together with the threaded member in the aperture of a body.

An object of the invention is to provide a fastening device which can be manufactured very inexpensively and assembled at low cost due to the fact that not only can inexpensive grades of steel be used in the fastener but also the threaded member co-operating ribs, slots, and studs can be formed in the forming or cold-heading operation without extra cost or operation.

An object of the invention is to provide a relatively narrow strip fastener having a top portion, side flanges, and outwardly-opening inwardly-projecting channels below the flanges adapted to respectively overlie the top, opposite sides, and bottom of a threaded member so as to cage the threaded member within the fastener on the top, bottom, and two opposite sides.

An object of the invention is to provide an aperture in the threaded member span-top portion for receiving a threaded member stud projection therein to prevent transverse sidewise movement of the fastener relative to the threaded member at two other opposite sides.

An object of the invention is to provide raised-ribs and/or slots on the threaded member bearing against the fastener and/or projections on the fastener preventing transverse sidewise movement of the fastener relative to the threaded member at two other opposite sides.

An object of the invention is to provide a projection on the fastener, such as a lanced finger or formed dimple, for transversely engaging a slot or projection on the threaded member to prevent sidewise movement at two other opposite sides.

An object of the invention is to provide paired body grip channels on the fastener each provided with opposite end portions wherein one opposite end portion is disposed on a radial arc and the other opposite end portion is disposed on a tangent wherein the arcuate portions provide turning radius for inserting and extracting the fastener relative to a body aperture and the tangent portions provide anti-rotational engagement therewith.

An object of the invention is to provide a depressible projection or finger in each said arcuate channel portion extending towards the tangent portion so as to easily bypass the body aperture side wall in the inserting direction and to semi-rigidly abut same in the extracting direction so as to lock the fastener in the body aperture.

An object of the invention is to provide radially offset channel portions on the fastener permitting easy insertion in a body aperture and subsequent angular turning to contact the off-channel portions into tangential engagement with the body walls.

These and other objects of the invention will become apparent by the reference to the following description of threaded member caging and fastening devices embodying the invention taken in connection with the accompanying drawings in which:

FIG. 1 is a top-plan view of the fastener and threaded member seen in FIG. 2.

FIG. 2 is a side-elevational view of the assembly seen in FIG. 1.

FIG. 3 is a view similar to FIG. 1 showing the device mounted relative to the sidewalls of a body aperture.

FIG. 4 is a cross-sectional view of FIG. 3 taken on a line 4—4 thereof.

FIG. 5 is a view similar to FIG. 3 showing the arcuate channel portions in co-operative turning relationship relative to the body aperture sidewalls for easy insertion and extraction.

FIG. 6 is a top plan view of a nut and fastener clip similar to that seen in FIGS. 1 to 5.

FIG. 7 is a cross-sectional view of the device seen in FIG. 6 taken on the line 7—7 thereof.

FIG. 8 is a side elevational view of the device seen in FIG. 6 taken on the line 8—8 thereof.

FIG. 9 is a bottom plan view of the device seen in FIGS. 6, 7, and 8.

FIG. 10 is a bottom plan view similar to FIG. 8 including a workpiece body in addition thereto showing the insertion position in solid lines and the partially rotated position in dotted lines, relative to the workpiece body.

FIG. 11 is a view similar to FIG. 10 showing the fully rotated mounted and attached position.

FIG. 12 is a top plan view of a bolt and fastener clip modification.

FIG. 13 is a cross sectional view of the device seen in FIG. 12 taken on the line 13—13 thereof.

FIG. 14 is a top plan view of a modified clip and workpiece body.

FIG. 15 is a cross sectional view of the device seen in FIG. 14 taken on the line 15—15 thereof; and FIG. 16 is a cross-sectional view of the device seen in FIG. 15 taken on the line 16—16 thereof.

Referring now to the drawings wherein like numerals refer to like and corresponding parts throughout the several views, the inventive strip fasteners and threaded members such as bolts and nuts disclosed therein to illustrate the invention comprise a threaded member 20 having a head-like portion 21 with a top 22, bottom 23, opposite sides 24 and 25, and opposite sides 26 and 27; the strip fastener 30 has a span portion 31 overlying the head top 22, paired depending side flanges 32 and 33 overlying the head sides 24 and 25 respectively, paired channels 34 and 35 below the flanges 32 and 33 which channels while opening outwardly also extending inwardly under the bottom 23 of the threaded member head portion so that the head portion 21 is caged in the strip fastener 30 on the top, bottom, and two opposite sides; relative sidewise movement in a transverse plane is prevented between the threaded member head portion 21 and the fastener 30 by the stud projection 28 on the head 21 lying in the aperture 29 of the fastener span portion 31 in the embodiment seen in FIGS. 1 through 5 and 12 through 16. Transverse sidewise movement is prevented in FIGS. 6–11 by the slots 41 and 42 on the head portion 40 abutting the fastener finger portions 43 and 44.

Referring now to the device seen in FIGS. 1–5, the body 50 has an aperture 51 defined, inter-alia, by the opposite sidewalls 52 and 53 and the fastener channels 34 and 35 respectively each have arcuate portions 36 and 37 and tangential portions 38 and 39 and these may lie on a radius of the threaded member 20 rotational axis as a base reference although an independent axis or plural axis may be employed. The depressably extending dogs or projections 61 and 62 are respectively lanced out of the arcuate channel portions 36 and 37 and extend towards the tangent portions 38 and 39 respectively so as to be easily by-passable relative to the body sidewalls 52 and 53 in insertion directional motion and to lie endwise abutting the aperture sidewalls 52 and 53 after they have been over ridden in the rotational insertion direction so that they endwise abut the body sidewalls 52 and 53 preventing rotation in the reverse direction.

In inserting the threaded member 20 and fastener 30 seen in FIGS. 1 through 5 in the body 50 aperture 51 between the sidewalls 52 and 53 thereof, the device is first disposed as seen in FIG. 5 with the arcuate portions 37 and 38 of the channels 34 and 35 leading into the sidewalls 52 and 53 so that upon turning the threaded member 20 and fastener 30 in the direction of the indicating arrows, the device is easily inserted in the aperture 51 since the arcuate portions 37 and 38 provide a leading cam area for spring tensioning the fastener 30 against the head portion opposite sides 24 and 25 in one way and against the body sidewalls 52 and 53 in the other way. In the turning direction indicated by the arrows, the projection dogs 61 and 62 are pressed back by the body sidewalls 52 and 53 until they by-pass at which point the tangent portions 38 and 39 of the channels 34 and 35 abut the side walls 52 and 53 of the body preventing further rotation and effecting engagement. This holds and positions the fastener 30 and threaded member 20 in the body 50 aperture 51 and it will be noted in FIG. 3 that the dog projections 61 and 62 prevent accidental rotation in the opposite direction to the indicating arrows with a mechanical engagement against the aperture sidewalls 52 and 53, but, it has been found that a well engineered aperture and clip that the device holds securely when the tangent portions 38 and 39 of the channels are in the pressed engagement with the aperture sidewalls 52 and 53 with the dogs 61 and 62 deleted. However the mechanical engagement of the dogs 61 and 62 is not thereby derogated.

It can now be seen that the fastener and threaded member combination of FIGS. 1 through 5 is easily assembled and inexpensively made due to the fact that the fastener may be made of inexpensive steel such as hot or cold rolled strip, that it can be easily formed in dies to the desired shape and size, and that it can be easily annexed to the threaded member 20 due to the fact that it is only necessary to press the fastener downwardly on the threaded member 20 whereby the channels 34 and 35 spring outwardly to by-pass the head portion opposite sides 24 and 25, and upon by-passing the channels 34 and 35, snap under the bottom 23 of the head portion while the fastener aperture 36 receives the stud 28 thereby easily annexing and mechanically interlocking the fastener 30 on the threaded member head 21. It is also to be observed that the device can be easily inserted in the aperture of a body due to the fact that the member can be turned easily by hand from the position of FIG. 5 to the positions of FIGS. 3 and 4 without the use of tools and that due to the mechanical action of the device it will stay in inserted relationship.

Referring now to the embodiment seen in FIGS. 6 through 11, the threaded member 40 has side slots 41 and 42 respectively receiving the FIGURES 43 and 44 lanced out of the clip fastener 45; the slots 41—42 and fingers 43—44 prevent transverse sliding movement of the member 40 and clip fastener 45 while sliding movement at 90 degrees thereto is prevented by the clip sides 46 and 47 abutting the sides of the member 40. The span portion 48 has an aperture 49 aligned with the member on nut aperture 54 with the span portion 48 caging the nut 40 at the top while the inwardly extending outwardly opening channels 55 and 56 abut and cage the nut 40 at the bottom: thus the nut 40 is caged at the top and bottom and opposite sides by the fastener top, sides, and channels with the fingers and slots caging the nut at 90 degrees to the side abutment completely holding the nut 40 in the clip fastener 45.

The nut 40 is easily inserted in the clip fastener 45 by pressing the nut 40 between the channels 55 and 56 which spring outwardly to permit insertion and spring back to effect holding while at the same time the fingers move into the slots.

It is to be particularly noted that the channels 55 and 56 each have a radially close end R substantially radially disposed relative to the span aperture 49 and the nut aperture 54 and each have a far end T substantially tangentially disposed relative to the span aperture 49 and the nut aperture 54 and the far tangential end T is counter disposed to the lead of the thread in the nut aperture 54 to effect holding.

In inserting the device of FIGS. 6 through 9 in the aperture 56 of a body 55 having opposite side walls 57 and 58, the nut and fastener are first located as illustrated by the solid lines of FIG. 10; the nut and fastener are then rotated relative to the aperture 56 so that the radially close ends R of the channels 55 and 56 engage the body aperture side walls 57 and 58 as indicated by dotted lines of FIG. 10 and due to their radially close location the channel ends R camwise compress the clip 45 sides 46 and 47 against the nut 40 sides permitting the channel close ends R to by-pass the body side walls 56 and 57, and, upon further turning as indicated by the arrows, the channel far ends T come into solid lever arm abutment with the body side walls 57 and 58 as seen in FIG. 11 so that the device is easily manually insertable in a body aperture by simple rotational movement without the use of compression tools and it can be seen that the device becomes further locked when a bolt is turned into the nut in the direction of the indicating arrows.

The modification seen in FIGS. 12 and 13 illustrates that the strip clip fastener of FIGS. 6 through 11 is also easily integrated with a bolt as well as with a nut, however, it is here pointed out that the bolt stud 63 and clip aperture 64 may be deleted and the bolt 65 head sides provided with slots 41 and 42 and the fastener 66 provided with fingers 43 and 44 as desired.

Referring now to the modification seen in FIGS. 14–16, it will be noted that the body 70 is provided with a slot 71 having a large end L for receiving a fastener and a small end S for interlocking with a fastener and threaded member. The bolt 72 has a head stud 73 lying in the aperture 74 of the fastener span portion which has sides leading down to the channels 76 and 77 which are equipped with leading arcuate ends 78 and 79 which act as compression cams when the fastener is moved into the small end S of the aperture 71 in the body 70. The span portion 75 is also equipped with an arm 80 having a depending dog 81 and a projection 82 for abutting the aperture 71 edge wall 83 to hold the clip and bolt in the small end S of the aperture 71.

In operation, FIGS. 14–16, the user inserts the bolt 72 and clip into the large end L of the aperture 71 with the arcuate ends 78 and 79 of the channels disposed toward the aperture small end S whereupon the user forces the device towards the small end S engaging the channel cam ends 78 and 79 with the small end S side walls forcing the channels inwardly compressing the sides of fastener on the bolt head and upon complete engagement the user snaps the dog 81 into engagement with the wall 83 with the projection 82 lying on the body 70 so that the arm 80 prevents reverse movement.

The mounting of the various fastening devices and threaded members in the aperture of a body is easily accomplished as hereinbefore described.

The inventive fasteners with the features described constitute very strong, compact, durable, and easily acting mechanism easily assembled together and easily mounted in an aperture of a body and provides positioning, holding, and relative anti-rotational securement with inventive simplicity.

Although but few embodiments of the invention have been shown and described in detail, it is obvious that many changes may be made in the size, shape, detail, and arrangements of the various elements of the invention within the scope of the appended claim.

I claim:

A device for positioning and securing a threaded member in a body having a fastener receiving aperture with opposite sides and for holding the threaded member against relative rotation comprising a threaded member having a head including top, bottom, and opposite sides, a fastener having a span portion overlying said threaded member head top preventing upward movement, paired depending side flanges on said fastener overlying said threaded member head opposite sides preventing relative sidewise movement in one plane, paired outwardly-opening inwardly-extending channels on said fastener abutting said threaded member head bottom preventing downward movement, and abutting means on said threaded member head engaging said fastener preventing relative sidewise movement in a plane transverse to the plane in which sidewise movement is prevented by said flanges; said fastener channels being adapted to be tensioned into a body aperture to engage the aperture opposite sidewalls by compressing fastener against said head whereby said fastener and said caged threaded member are positioned and secured relative to a body with both held against relative rotation; said paired channels having opposite end portions with one end portion disposed arcuately along a radial arc from the axis of said threaded member and the other end portion merging with the arcuate portion and disposed along a straight line tangent to said arc, each of said end portions comprising approximately one half the length of the channel; said paired channel arcuate and tangent portions lying diametrically opposite one another so as to be rotatably co-operative relative to the opposite sidewalls of a body aperture; said arcuate portions providing turning radius for inserting and extracting said fastener and caged threaded member relative to body aperture opposite sidewalls and said tangent portions providing mechanical contact with a body aperture opposite sidewalls so as to effect anti-rotational engagement therewith and a depressable projection in each said channel arcuate portion extending toward said tangent portion so as to easily by-pass a body aperture side-wall in the inserting direction and semi-rigidly abut same in the extracting direction.

References Cited in the file of this patent

UNITED STATES PATENTS

| | | |
|---|---|---|
| 2,025,686 | Johnson | Dec. 24, 1935 |
| 2,596,332 | Flora et al. | May 13, 1952 |
| 2,649,126 | Tinnerman | Aug. 18, 1953 |
| 2,658,546 | Crowther | Nov. 10, 1953 |
| 2,746,111 | Chvosta | May 22, 1956 |